US012402210B2

(12) United States Patent
Fee et al.

(10) Patent No.: US 12,402,210 B2
(45) Date of Patent: Aug. 26, 2025

(54) METHOD AND APPARATUS TO PROVIDE AN INTEGRATED UNIFIED HEAT SOURCE FOR CHAFING DISHES

(71) Applicant: IPH LLC, Mesquite, TX (US)

(72) Inventors: John A. Fee, Knoxville, TN (US); Luis Perez, Mesquite, TX (US)

(73) Assignee: IPH LLC, Mesquite, TX (US)

( * ) Notice: Subject to any disclaimer, the term of this patent is extended or adjusted under 35 U.S.C. 154(b) by 0 days.

(21) Appl. No.: 18/440,171

(22) Filed: Feb. 13, 2024

(65) Prior Publication Data

US 2024/0276601 A1 Aug. 15, 2024

Related U.S. Application Data

(60) Provisional application No. 63/484,576, filed on Feb. 13, 2023, provisional application No. 63/484,563, filed on Feb. 13, 2023.

(51) Int. Cl.
*H05B 1/02* (2006.01)
*H05B 3/14* (2006.01)

(52) U.S. Cl.
CPC ........... *H05B 1/0252* (2013.01); *H05B 3/145* (2013.01); *H05B 2214/04* (2013.01)

(58) Field of Classification Search
CPC ....... H05B 1/00; H05B 1/0261; H05B 1/0263
See application file for complete search history.

(56) References Cited

U.S. PATENT DOCUMENTS

| | | | | | |
|---|---|---|---|---|---|
| 4,967,057 | A * | 10/1990 | Bayless | H05B 3/36 392/435 |
| 5,344,696 | A * | 9/1994 | Hastings | B64D 15/12 442/379 |
| 5,981,911 | A * | 11/1999 | Miller | H05B 3/36 219/544 |
| 2004/0065658 | A1* | 4/2004 | Damiano | A47J 36/2483 219/524 |
| 2005/0252904 | A1* | 11/2005 | Grabowski | F24C 7/10 219/387 |
| 2007/0204857 | A1* | 9/2007 | Reusche | A01K 1/0353 126/374.1 |
| 2009/0272728 | A1* | 11/2009 | Abbott | H05B 3/68 219/399 |
| 2015/0245729 | A1* | 9/2015 | Morin | H05B 1/0261 219/533 |
| 2018/0003392 | A1* | 1/2018 | Babu | F24C 15/103 |
| 2018/0193185 | A1* | 7/2018 | Thomas | A61F 7/007 |

* cited by examiner

*Primary Examiner* — Steven W Crabb
*Assistant Examiner* — Spencer H. Kirkwood
(74) *Attorney, Agent, or Firm* — Edwin S. Flores; Daniel J. Chalker; Chalker Flores, LLP

(57) ABSTRACT

A chafing dish heating apparatus including an electrical heating pad configured to be placed within a chafing dish receptacle and connectable to a power source; a receptacle reflector configured to receive the chafing dish receptacle; a receptacle insulator configured to receive the receptacle reflector; a lid reflector configured to receive a chafing dish lid; a lid insulator configured to receive the lid reflector; and a thermostat connected to the electrical heating pad and configured to be connected to a power source.

18 Claims, 16 Drawing Sheets

METHOD AND APPARATUS TO PROVIDE AN INTEGRATED UNIFIED HEAT SOURCE FOR CHAFING DISHES

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to food delivery. In particular, the present invention relates to heating food in chafing dishes.

BACKGROUND OF THE INVENTION

Even today, many different food groups are heated using chafing dishes with open flame Sterno liquid. The heating uniformity performance is not acceptable unless the food products are stirred on a regular basis. Furthermore, there have been many fires started because of the use of Sterno as well as human beings burning their skin moving the hot chafing dish to replace the burned out Sterno dishes. Safety issues with Sterno have been described in, e.g., “Sterno Recalls Portable Butane Stoves Due to Fire and Burn Hazards,” United States Consumer Product Safety Commission, and “Sterno Recalls Tea Lights Due to Fire and Burn Hazard,” United States Consumer Product Safety Commission. What is needed is a much safer better uniform heating element across the surface, and controllable temperature across the heated surface area.

As the burgeoning home food delivery market is growing quickly and energy costs are increasing, there is a greater need for home delivery of food products. Specifically, the technology being discussed is heating delivery of foods that have been transported from the origination facility where the food is heated to the consumer at the destination. Typically, the heated food is carried in a container which is in slipped into an insulated bag that is used to keep food warm. No active heating electronics are provided in this basic configuration. However, if many deliveries are required throughout the day, eventually the heating pads will eventually leak all of the insulating properties, and the food inside will cool. This presents a problem because foods like pizza will be cold as delivered to the customer because of their small thermal mass. What is needed is a method and apparatus provide and integrated unified heat source for food in carrying bags.

SUMMARY OF THE INVENTION

As embodied and broadly described herein, an aspect of the present disclosure relates to a chafing dish heating apparatus comprising, consisting essentially of, or consisting of an electrical heating pad or cooling device configured to be placed within a chafing dish receptacle and connectable to a power source; an inner receptacle reflector, an inner receptacle insulator; an outer receptacle insulator; and outer receptacle reflector, or a combination of the inner or outer receptacle reflector and the inner or outer receptacle insulator; an inner lid reflector, an inner lid insulator, an outer lid reflector, an outer lid insulator, or a an inner lid reflector, an inner lid insulator, an outer lid reflector, an outer lid insulator, or a combination of the inner or outer lid reflector and the inner or outer lid insulator; and a thermostat connected to the electrical heating pad and configured to be connected to a power source. In one aspect, the chafing dish heating apparatus further includes a universal intelligent interface including one or more nanoprocessors and one or more connections to which the electrical heating pad and the thermostat are connected and to which the power source may be connected. In another aspect, the power source is an alternating-current source or a direct-current source. In another aspect, the thermostat is manually operable. In another aspect, the thermostat is programmable. In another aspect, the thermostat detects an impedance of the electrical heating pad and adjusts a power supplied to the electrical heating pad to heat the food parcel to a selected temperature or to maintain the food parcel at the selected temperature. In another aspect, the electrical heating pad comprises one or more independently controllable heating elements and one or more temperature sensors, wherein each of the one or more independently controllable heating elements can be independently controlled. In another aspect, the chafing dish heating apparatus further includes one or more accelerometers operably connected to the thermostat and operably configured to detect accelerations in three dimensions. In another aspect, the one or more accelerometers are operably configured to detect and distinguishing an acceleration characteristic of lifting the chafing dish heating apparatus, an acceleration characteristic of lowering the chafing dish apparatus, and an acceleration characteristic of carrying the chafing dish heat apparatus to save energy, for safety, or measure the length of time that the food has been heated.

As embodied and broadly described herein, another aspect of the present disclosure relates to a method of heating a food parcel in a chafing dish comprising, consisting essentially of, or consisting of providing a food parcel requiring heating, wherein the food parcel is contained within a food bag; providing a chafing dish including a chafing dish receptacle and a chafing dish lid; providing a chafing dish heating apparatus including an electrical heating pad or cooling device configured to be placed within a chafing dish receptacle and connectable to a power source; an inner receptacle reflector, an inner receptacle insulator; an outer receptacle insulator; and outer receptacle reflector, or a combination of the inner or outer receptacle reflector and the inner or outer receptacle insulator; an inner lid reflector, an inner lid insulator, an outer lid reflector, an outer lid insulator, or a combination of the inner or outer lid reflector and the inner or outer lid insulator; and a thermostat connected to the electrical heating pad and configured to be connected to a power source; placing the electrical heating pad into the chafing dish receptacle; placing a food bag containing the food parcel into the chafing dish receptacle on the electrical heating pad, wherein the food parcel has not been pre-heated or the food parcel has been preheated; setting a selected temperature using the thermostat; and heating the food parcel to the selected temperature where the food parcel has not been pre-heated or maintaining the food parcel at the selected temperature where the food parcel has been pre-heated. In one aspect, the power source is an alternating-current source or a direct-current source. In another aspect the thermostat is manually operable. In another aspect, the thermostat is programmable. In another aspect, the method further includes detecting an impedance of the electrical heating pad with the thermostat; and adjusting a power supplied to the electrical heating pad to heat the food parcel to the selected temperature. In another aspect, the electrical heating pad includes a plurality of independently controllable heating elements. In another aspect, the chafing dish heating apparatus further includes one or more accelerometers operably connected to the thermostat and operably configured to detect accelerations in three dimensions; and the method further includes further including detecting accelerations in three dimensions. In another aspect, the one or more accelerometers are operably configured to detect and distinguish an acceleration characteristic of lifting the chafing dish heating apparatus, an acceleration characteristic of lowering the chafing dish apparatus, and an acceleration characteristic of carrying the chafing dish heat apparatus; and the method further includes detecting and distinguishing an acceleration characteristic of lifting the chafing dish heating apparatus, an acceleration characteristic of lowering the chafing dish apparatus, and an acceleration characteristic of carrying the chafing dish heat apparatus to save energy or for safety. In another aspect, the chafing dish heating apparatus further includes a universal intelligent interface including one or more nanoprocessors and one or more connections to which the electrical heating pad and the thermostat are connected and to which the power source may be connected.

As embodied and broadly described herein, another aspect of the present disclosure relates to a chafing dish heating apparatus comprising, consisting essentially of, or consisting of a frame including a bottom, a plurality of sides, and a plurality of legs, wherein the frame is configured to receive a bottom layer, a reflector layer, a heating pad, and a metal screen; the bottom layer in contact with the bottom of the frame; the reflector layer in contact with the bottom layer; the reflector layer in contact with the bottom layer; the heating pad in contact with the reflector layer; and the metal screen in contact with the heating pad.

As embodied and broadly described herein, another aspect of the present disclosure relates to a heating apparatus comprising, consisting essentially of, or consisting of a heating pad, a thermostat electrically connected to the heating pad, and universal intelligent interface electrically connected to the heating pad and the thermostat; wherein the heating pad, the thermostat, and the universal intelligent interface are incorporated into a therapy heating pad, a vest, a jacket, a scarf, a blanket, a handwarmer, a footwarmer, a sleeping bag, an item of animal clothing, an animal blanket, a seat cushion, a golf cart seat, motorcycle seat, or a wheelchair seat.

As embodied and broadly described herein, another aspect of the present disclosure relates to a chafing dish heating apparatus including a water pan configured to be placed in a chafing dish receptacle; a receptacle insulator; a receptacle electrical heating pad; a lid insulator configured to be placed in a chafing dish lid; a lid reflector; and a thermostat connected to the receptacle electrical heating pad and configured to be connected to a power source. In one aspect, the chafing dish heating apparatus further includes a lid electrical heating pad connected to the thermostat and configured to be connected to the power source. In another aspect, the receptacle insulator or the lid insulator or both comprise foam or compressed foam.

As embodied and broadly described herein, another aspect of the present disclosure relates to a food carrying delivery bag comprising, consisting essentially of, or consisting of an electrical heating pad; a reflector enveloping the electrical heating pad or cooling device and configured to receive a food parcel adjacent to the electrical heating pad; an insulator enveloping the reflector; and a thermostat connected to the electrical heating pad and configured to be connected a power source. In one aspect, the food carrying delivery bag further includes a universal intelligent interface includes one or more nanoprocessors and one or more connections to which the electrical heating pad and the thermostat are connected and to which the power source may be connected. In another aspect, the power source is an alternating-current source or a direct-current source. In another aspect, the thermostat is manually operable. In another aspect, the thermostat is programmable. In another aspect, the thermostat detects an impedance of the electrical heating pad and adjusts a power supplied to the electrical heating pad to heat the food parcel to a selected temperature or to maintain the food parcel at the selected temperature. In another aspect, the electrical heating pad comprises one or more independently controllable heating elements and one or more temperature sensors, wherein each of the one or more independently controllable heating elements can be independently controlled. In another aspect, the food carrying delivery bag further includes one or more accelerometers operably connected to the thermostat and operably configured to detect accelerations in three dimensions. In another aspect, the one or more accelerometers are operably configured to detect and distinguishing an acceleration characteristic of moving the food carrying delivery bag.

As embodied and broadly described herein, another aspect of the present disclosure relates to a method of heating a food parcel or maintaining the temperature of a food parcel comprising, consisting essentially of, or consisting of providing a food carrying delivery bag including an electrical heating pad or cooling device; a reflector enveloping the electrical heating pad and configured to receive a food parcel adjacent to the heating pad; an insulator enveloping the reflector; and a thermostat connected to the electrical heating pad and configured to be connected a power source; setting a selected temperature using the thermostat; inserting the food parcel into the reflector and adjacent to the electrical heating pad, wherein the food parcel has not been pre-heated or the food parcel has been pre-heated; heating the food to the selected temperature where the food parcel has not been preheated or maintaining the food parcel at the selected temperature where the food parcel has been pre-heated. In one aspect, the power source is an alternating-current source or a direct-current source. In another aspect, the thermostat is manually operable. In another aspect, the thermostat is programmable. In another aspect, the method further includes detecting an impedance of the electrical heating pad; and adjusting a power supplied to the electrical heating pad to heat the food parcel to the selected temperature. In another aspect, the electrical heating pad includes a plurality of independently controllable heating elements and a plurality of temperature sensors. In another aspect, the food carrying delivery bag further includes one or more accelerometers operably connected to the thermostat and operably configured to detect accelerations in three dimensions; and the method further includes detecting accelerations in three dimensions. In another aspect, the one or more accelerometers are operably configured to detect and distinguish an acceleration characteristic of moving the food carrying delivery bag; and the method further includes detecting and distinguishing an acceleration characteristic of moving the food carrying delivery bag to save energy and for safety. In another aspect, the food carrying delivery bag further includes a universal intelligent interface including one or more nanoprocessors and one or more connections to which the electrical heating pad and the thermostat are connected and to which the power source may be connected.

As embodied and broadly described herein, another aspect of the present disclosure relates to an insertable food warmer comprising, consisting essentially of, or consisting of a bottom layer; a reflector layer; a heating pad; and a metal screen; wherein the bottom layer, the reflector layer, the heating pad, and the metal screen are bound together as a unit and configured to be inserted into a food vessel.

As embodied and broadly described herein, another aspect of the present disclosure relates to a food carrying delivery bag comprising, consisting essentially of, or consisting of a carrier; a bottom layer; a heating pad on top of the bottom layer; and a metal screen; wherein the bottom layer, the heating pad, and the metal screen are bound together as a unit and integrated into an interior of the carrier.

As embodied and broadly described herein, another aspect of the present disclosure relates to a heating pad, a thermostat electrically connected to the heating pad, and universal intelligent interface electrically connected to the heating pad and the thermostat; wherein the heating pad, the thermostat, and the universal intelligent interface are incorporated into a therapy heating pad, a vest, a jacket, a scarf, a blanket, a handwarmer, a footwarmer, a sleeping bag, an item of animal clothing, an animal blanket, a seat cushion, a golf cart seat, motorcycle seat, or a wheelchair seat.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1A:
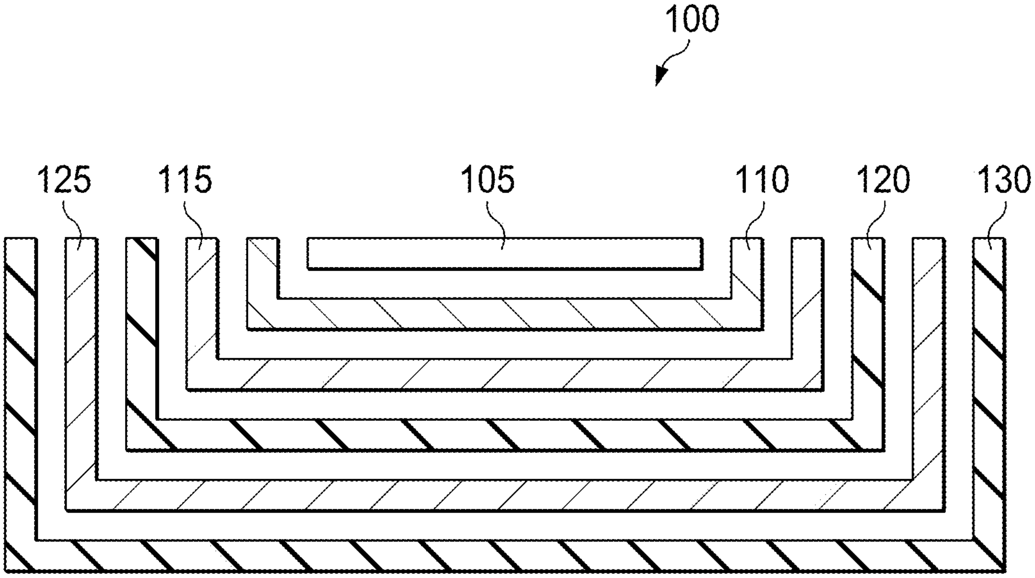
FIGS. 1A and 1B shows a cutaway view of an embodiment of the invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A test was performed on the nano technology heating device described herein coupled with a thermally regulated power supply to prove an application solution to replace Sterno flames for the chafing dish. The test was to determine whether or not the nano technology could maintain the proper heating level to keep the food at the prescribed temperature. The nano technology heating device was placed in the bottom of a chafing tray and the heated beans were placed in the chafing dish in a sealed bag at 145° F. on top of the nano technology heating system. The water bath normally associated with the chafing dish is not used. However, the water bath pan is still used. Prior to this test, a standard Sterno flame was installed on the bottom equidistant below the chafing dish and was heating the water above in its own water bath pan. Similarly, the beans were placed at 145° F. in the vaporized steaming water in the standard and long-used configuration. Both test set ups were monitored with thermocouples to test the heat of the beans at different vertical levels. The levels that were sequentially tested were the bottom, middle, and top of the beans. An infrared laser thermometer was used to scan the top of the food. The following temperatures were measured: (1) at the bottom of the beans, the standard Sterno measured 174° F. and at the bottom of the beans, the temperature was 172° F.; (2) at the midway point of the beans, the Sterno measured 138° F. and the technology measured 154° F.; (3) at the top of the beans, the Sterno measurement was 121° F. and in the configuration the beans were measured at 140° F. Since the minimum safe level for avoiding food poisoning bacteria is 138° F., the Sterno flame system failed the requirement and the age-old trust in the Sterno flame reveals that it may be impossible to prevent bacteria and food poisoning, if food is not stirred. The solutions required approximately a 110 W power feed but it will continually regulate the temperature to a very precise level to eliminate possible food poisoning, whereas the Sterno steam system has no such temperature control and regulation. Furthermore, after about two hours, the Sterno needs to be replaced. Before the Sterno completely burns out, the heat output decreases and if not promptly replaced, the water bath and food will cool. In the case of the solutions, no replacement is needed as the chafing dish can operate as long is the AC power is supplied. In addition, since the standard interface will be 48 V, a battery option may be supplied as well.

Figure 1B:
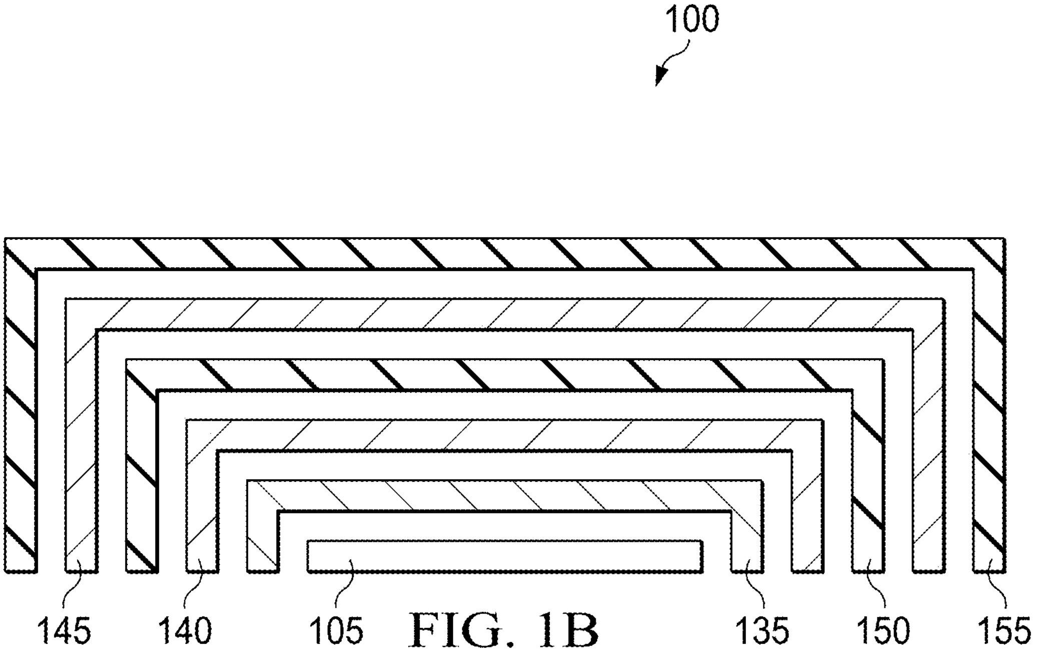

FIGS. 1A and 1B show an embodiment of the present invention. As shown in FIG. 1A, a chafing dish heating apparatus 100 includes an electrical heating pad 105 configured to be placed within a chafing dish receptacle 110 and connectable to a power source (not shown); an inner receptacle reflector 115 configured to receive the chafing dish receptacle 110; an inner receptacle insulator 120 configured to receive the inner receptacle reflector 115; an outer receptacle reflector 125 configured to receive the inner receptacle insulator 120; and an outer receptacle insulator 130 configured to receive the outer receptacle 125. As shown in FIG. 1B, the chafing dish heating apparatus 100 also includes an inner lid reflector 135; an inner lid insulator 140 configured to receive the lid reflector 135; an outer lid reflector 145 configured to receive a chafing dish lid 150; and an outer lid insulator 155 configured to receive the outer lid reflector 145. The chafing dish heating apparatus 100 also includes a thermostat (not shown) connected to the electrical heating pad 105 and configured to be connected to a power source (not shown). In some aspects of the invention, the electrical heating pad 105 is a carbon-fiber heater or a nanotech heater.

Figure 2:
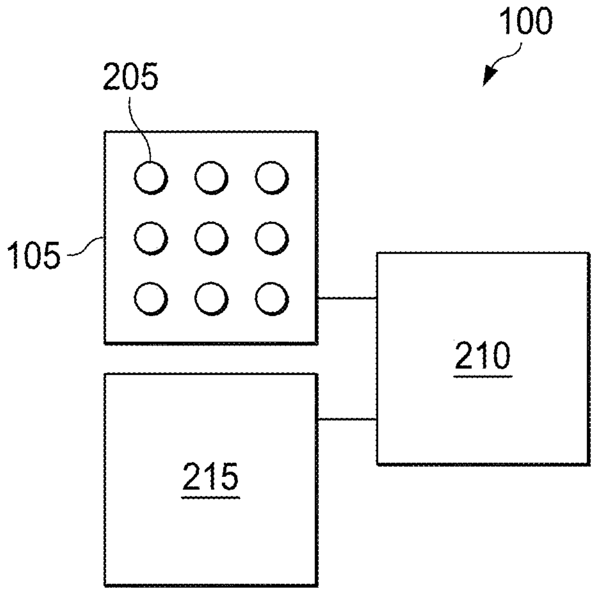
FIG. 2 shows a block diagram of aspects of the invention.

FIG. 2 shows further aspects of the chafing dish heating apparatus 100. The electrical heating pad 105 includes a plurality of independently controllable heating elements 205, of which two are indicated in the figure for clarity. The thermostat 210, which may include one or more thermistors (not shown), controls each of the plurality of heating elements 205 to establish and maintain the desired temperature (s) across the electrical heating pad 105. To conserve electrical power and for safety reasons, the chafing dish heating apparatus 100 includes one or more accelerometers 215 operably connected to the thermostat 210 and operably configured to sense movements in three dimensions to sense when the chafing dish heating apparatus 100 is in motion (and in what kind of motion) or at rest. When the one or more accelerometers 215 sense that the chafing dish (not shown) and the chafing dish heating apparatus 100 are being carried from one location to another by sensing the distinct accelerations associated with such motion, the thermostat 210 turns the electrical heating pad 105 off. When the one or more accelerometers 215 detect no motion or the distinct accelerations associated with lifting the chafing dish lid (not shown) and the chafing dish heating apparatus 100, the thermostat 210 turns on the electrical heating pad 105. The one or more accelerometers 215 may also be used in conjunction with a timer to determine how long the chafing dich heating apparatus has been stationary and to indicate to a user that the food may no longer be fresh.

Figure 3:
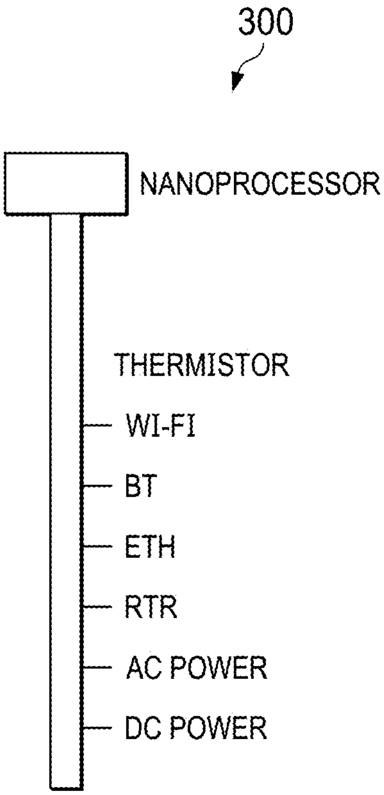
FIG. 3 shows an intelligent interface of the invention.

FIG. 3 shows a universal intelligent interface 300 of an embodiment of the present invention. The universal intelligent interface 300 includes connections for alternating-current power and/or direct-current power; one or more router (RTR), ethernet, Bluetooth® (BT), Wi-Fi™ and/or other types of connections by which the electrical heating pad 105, the thermostat 210, and the one or more accelerometers 215 can be connected to the universal intelligent interface 300; and one or more nanoprocessors for control of the devices connected to the universal intelligent interface 300. In some aspects, the universal intelligent interface 300 includes universal Lego®-type connectors.

Figure 4:
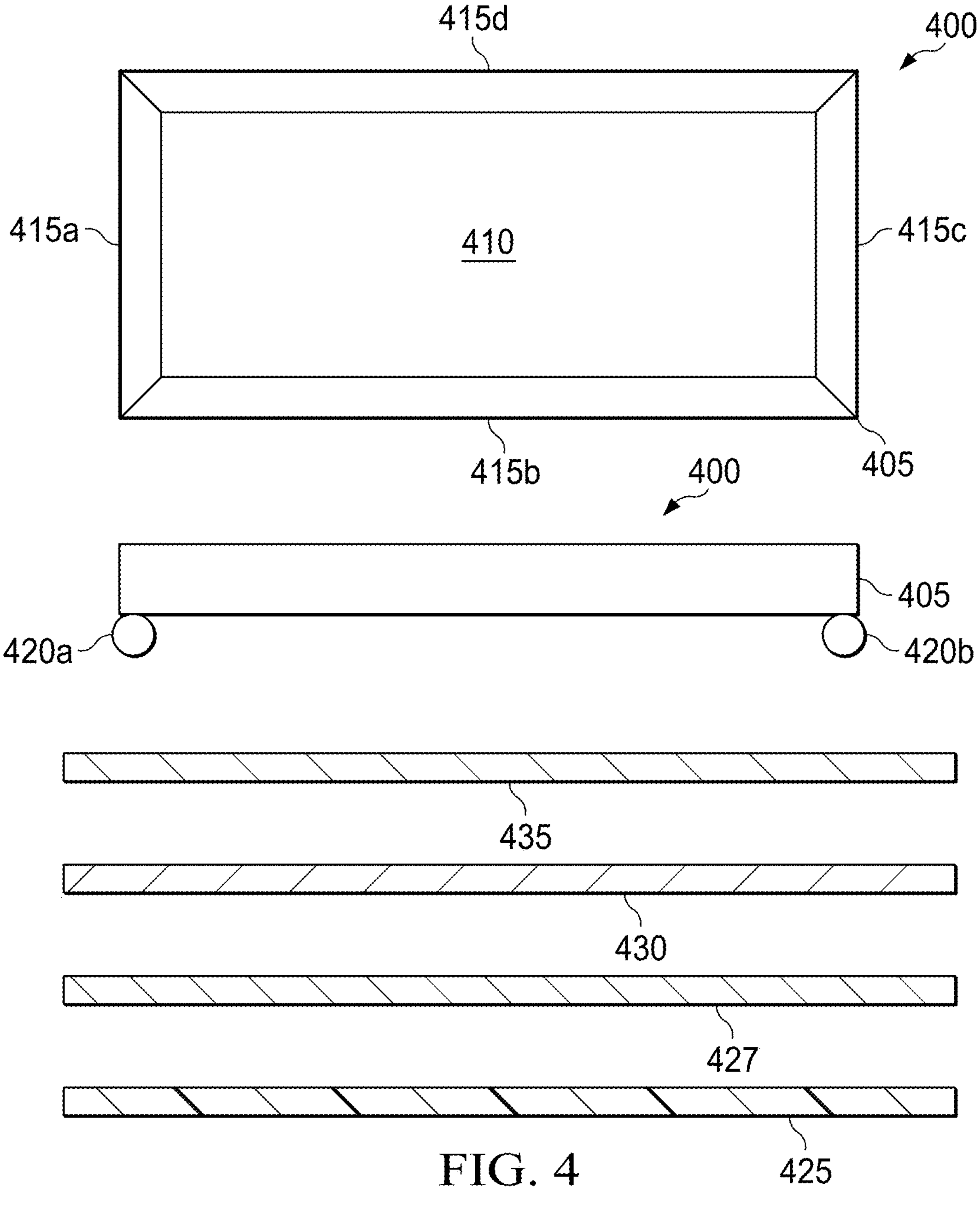
FIG. 4 shows another embodiment of the invention.

FIG. 4 shows an embodiment of the present invention. The chafing dish heating apparatus 400 includes a frame 405 including a bottom 410 and a plurality of sides 415*a-d*, with further includes a plurality of legs 420*a-d* (legs 420*c, d* not shown) to elevate the chafing dish heating apparatus 400 above a serving surface (not shown). The frame 405 is configured to receive a bottom layer 425 of waterproof, heat resistant, and cleanable material, which may include a thermoplastic polymer such as polytetrafluoroethylene (PTFE); a reflector layer 427 on top of the bottom layer 425; a waterproof, cleanable, and reusable heating pad 430 on top of the reflector layer 427, wherein the heating pad 430 is configured to be connectable to a power source (not shown); and a cleanable metal screen 435 on top of the heating pad 430, wherein the metal screen may include aluminum and be configured as a mesh. The bottom layer 425, the reflector layer 427, the heating pad 430 (or cooling pad 430), and the metal screen 435 may be bound together. Once the bottom layer 425, the reflector layer 427, the heating pad 430, and the metal screen 435 are placed in the frame 405, the chafing dish heating apparatus 400 is ready to receive a chafing dish or similarly configured serving dish containing a food product to be served warm. The chafing dish heating apparatus 400 may include a plurality of independently controllable heating elements (not shown) contained within the heating pad 430, each controlled by a thermostat which may include one or more thermistors (not shown), and one or more accelerometers (not shown) operably connected to the thermostat and operably configured to sense movements in three dimensions to sense when the chafing dish heating apparatus 400 is in motion (and in what kind of motion) or at rest. The one or more accelerometers may also be used in conjunction with a timer to determine how long the chafing dich heating apparatus has been stationary and to indicate to a user that the food may no longer be fresh. The heating elements, thermostat, and accelerometers of the chafing dish heating apparatus 400 are similar to those described with reference to FIG. 2 herein. The chafing dish heating apparatus 400 may also include a universal intelligent interface 300 as described with reference to FIG. 3 herein. The chafing dish heating apparatus 400 may also include the inner lid reflector 135; the inner lid insulator 140 configured to receive the lid reflector 135; the outer lid reflector 145 configured to receive a chafing dish lid 150; and the outer lid insulator 155 configured to receive the outer lid reflector 145 that are shown in FIG. 1B and described herein.

In one embodiment, the chafing dish heating apparatus 100 includes a seal to seal the chafing dish heating apparatus 100 with the chafing dish lid 130 to the chafing dish receptacle 110.

The power source may be an alternating-current source or a direct-current source, including but not limited to solar power and one or more chargeable or disposable batteries. The power source may be corded or non-corded. The thermostat may be manually operable or automatic. The thermostat may be programmable. In one embodiment, the thermostat detects an impedance of the electrical heating pad and adjusts a power supplied to the heating elements of the electrical heating pad to heat the food parcel to a selected temperature.

In various embodiments of the invention, a heating pad such as the heating pad 105 or the heating pad 430, a thermostat such as the thermostat 210, and a universal intelligent interface such as the universal intelligent interface 300 are incorporated into clothing and related items, furniture, and vehicle seats. Clothing and related items into which the heating pad, the thermostat, and the universal intelligent interface can be incorporated include but are not limited to a therapy heating pad, a vest, a jacket, a scarf, a blanket, a handwarmer, a footwarmer, a sleeping bag, and an item of animal clothing or an animal blanket. Furniture into which the heating pad, the thermostat, and the universal intelligent interface can be incorporated include but are not limited to a seat cushion. Vehicle seats into which the heating pad, the thermostat, and the universal intelligent interface can be incorporated include but are not limited to a golf cart seat, motorcycle seat, and a wheelchair seat.

Figure 5:
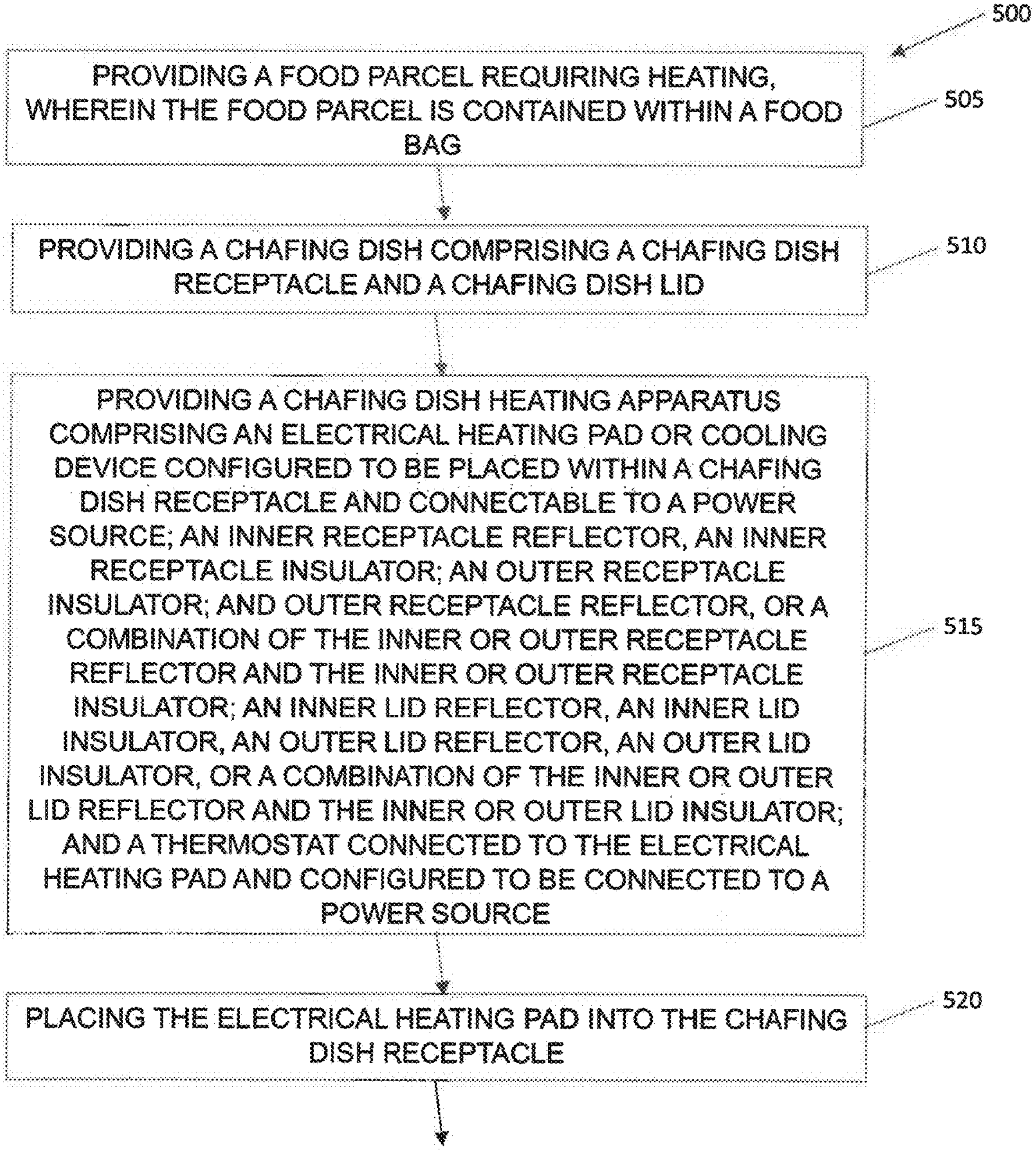
FIG. 5 shows a flowchart for a method embodiment of the invention.

FIG. 5 shows a flowchart of a method embodiment of the invention. Method 500 includes blocks 505, 510, 515, 520, 525, 530, and 535. Block 505 includes providing a food parcel requiring heating, wherein the food parcel is contained within a food bag. Block 510 includes providing a chafing dish comprising a chafing dish receptacle and a chafing dish lid. Block 515 includes providing a chafing dish heating apparatus including an electrical heating pad or cooling device configured to be placed within a chafing dish receptacle and connectable to a power source; an inner receptacle reflector, an inner receptacle insulator; an outer receptacle insulator; and outer receptacle reflector, or a combination of the inner or outer receptacle reflector and the inner or outer receptacle insulator; an inner lid reflector, an inner lid insulator, an outer lid reflector, an outer lid insulator, or a combination of the inner or outer lid reflector and the inner or outer lid insulator; and a thermostat connected to the electrical heating pad and configured to be connected to a power source. Block 520 includes placing the electrical heating pad into the chafing dish receptacle. Block 525 includes placing a food bag containing the food parcel into the chafing dish receptacle on the electrical heating pad, wherein the food parcel has not been pre-heated or the food parcel has been pre-heated. Block 530 includes setting a selected temperature using the thermostat. Block 535 includes heating the food parcel to the selected temperature where the food parcel has not been preheated or maintaining the food parcel at the selected temperature where the food parcel has been pre-heated.

Figure 6A:
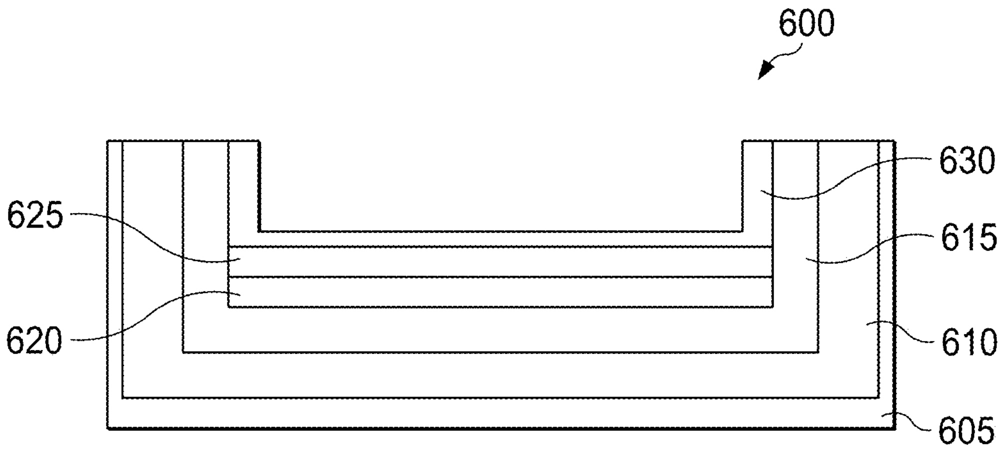
FIGS. 6A-6E show another embodiment of the invention.
Figure 6B:
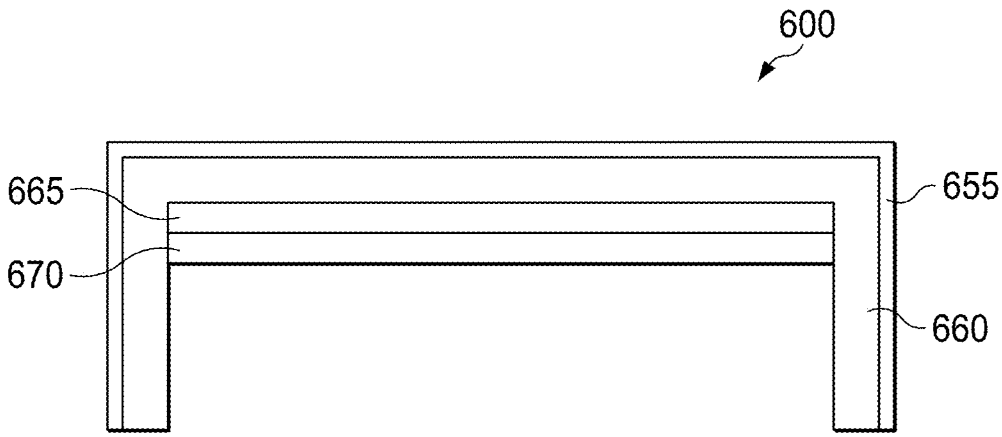

FIGS. 6A and 6B show another embodiment of the present invention. As shown in FIG. 6A, a chafing dish heating apparatus 600 includes a water pan 610 configured to hold water, configured to be placed in a chafing dish receptacle 605, configured to receive a receptacle insulation 615 (including, e.g., foam or compressed foam), and connectable to a power source (not shown); the receptacle insulator 615, configured to receive a receptacle reflector 620; the receptacle reflector 620; a receptacle electrical heating pad 625 disposed adjacent to the receptacle reflector 620. The electrical heating pad 625 is disposed to heat food placed in a food receptacle 630. As shown in FIG. 6B, the chafing dish heating apparatus 600 also includes a lid insulator 660 (including, e.g., foam or compressed foam), configured to be placed in a chafing dish lid 655, configured to receive a lid reflector 665; the lid reflector 665, configured to receive a lid heating pad 670. Some aspects of the chafing dish heating apparatus 600 include the lid heating pad 670. The chafing dish heating apparatus 600 also includes a thermostat (not shown) connected to the receptacle electrical heating pad 625 (and, if present, the lid electrical heating pad 665) and configured to be connected to a power source (not shown). In some aspects of the invention, the electrical heating pads 625 and 665 each are a carbon-fiber heater or a nanotech heater. The embodiment of the receptacle components shown in FIG. 6A may be used with or without the lid components shown in FIG. 6B.

Figure 6C:
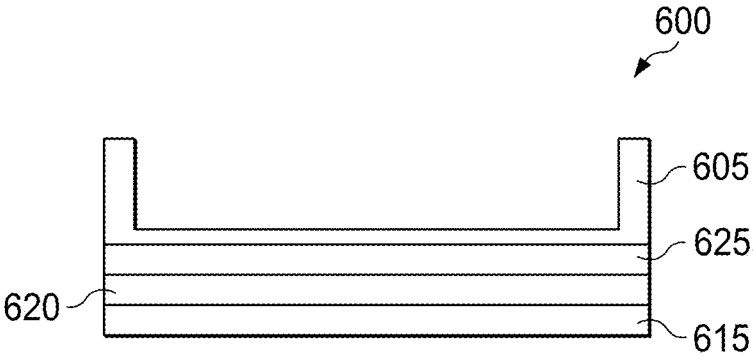

FIG. 6C shows another embodiment of the present invention. In this embodiment, the chafing dish heating apparatus 600 includes receptacle insulator 615, configured to receive a receptacle reflector 620; the receptacle reflector 620; a receptacle electrical heating pad 625 disposed adjacent to the receptacle reflector 620; and a chafing dish receptacle 605 adjacent to the receptacle electrical heating pad 625, configured to receive food to be heated. The embodiment of the receptacle components shown in FIG. 6C may be used with or without the lid components shown in FIG. 6B.

Figure 6D:
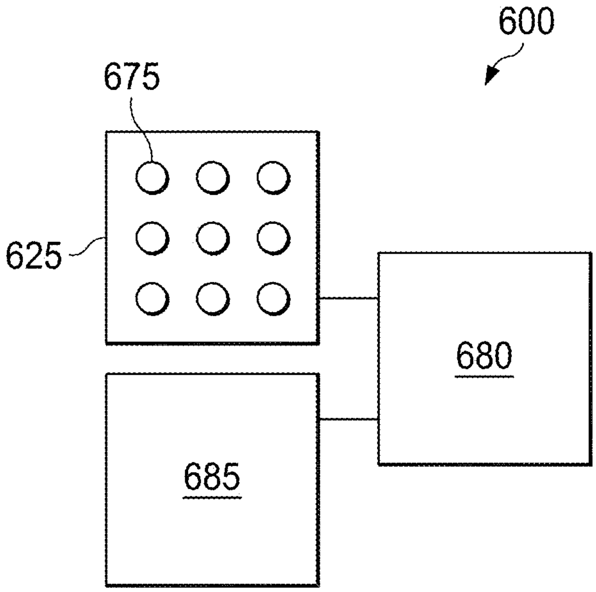

FIG. 6D shows further aspects of the chafing dish heating apparatus 600. The receptacle electrical heating pad 625 includes a plurality of independently controllable heating elements 275, of which one is indicated in the figure for clarity. The thermostat 680, which may include one or more thermistors (not shown), controls each of the plurality of heating elements 275 to establish and maintain the desired temperature(s) across the receptacle electrical heating pad 625. To conserve electrical power and for safety reasons, the chafing dish heating apparatus 600 includes one or more accelerometers 685 operably connected to the thermostat 680 and operably configured to sense movements in three dimensions to sense when the chafing dish heating apparatus 600 is in motion (and in what kind of motion) or at rest. When the one or more accelerometers 685 sense that the chafing dish (not shown) and the chafing dish heating apparatus 600 are being carried from one location to another by sensing the distinct accelerations associated with such motion, the thermostat 680 turns the receptacle electrical heating pad 625 off. When the one or more accelerometers 685 detect no motion or the distinct accelerations associated with lifting the chafing dish lid (not shown) and the chafing dish heating apparatus 600, the thermostat 680 turns on the receptacle electrical heating pad 625. The one or more accelerometers 685 may also be used in conjunction with a timer to determine how long the chafing dich heating apparatus has been stationary and to indicate to a user that the food may no longer be fresh.

Figure 6E:
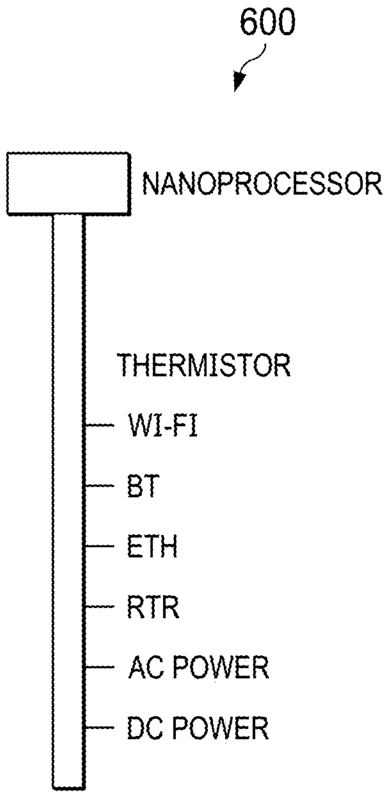

FIG. 6E shows a universal intelligent interface 690 of an embodiment of the present invention. The universal intelligent interface 690 includes connections for alternating-current power and/or direct-current power; one or more router (RTR), ethernet, Bluetooth® (BT), Wi-Fi™ and/or other types of connections by which the receptacle electrical heating pad 625, the thermostat 680, and the one or more accelerometers 685 can be connected to the universal intelligent interface 690; and one or more nanoprocessors for control of the devices connected to the universal intelligent interface 690. In some aspects, the universal intelligent interface 690 includes universal Lego®-type connectors.

Figure 7:
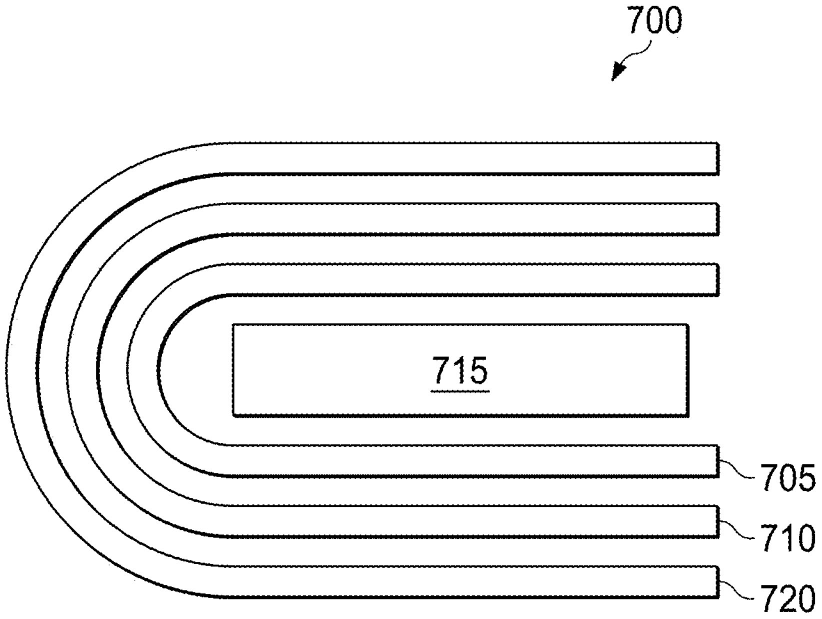
FIG. 7 shows a cutaway view of an embodiment of the invention.

FIG. 7 shows an embodiment of the present invention. A food carrying delivery bag 700 includes an electrical heating pad 705 or a cooling device (not shown), a reflector 710 enveloping the electrical heating pad 705 and configured to receive a food parcel 715 adjacent to the electrical heating pad 705; an insulator 720 enveloping the reflector 710; and a thermostat (not shown) connected to the electrical heating pad 705 and configured to a power source (not shown). In some aspects of the invention, the electrical heating pad 705 is a carbon-fiber heater or a nanotech heater.

Figure 8:
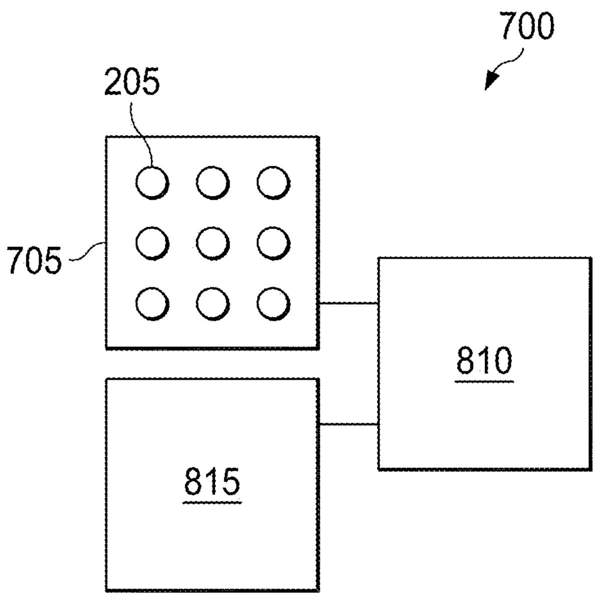
FIG. 8 shows a block diagram of aspects of the invention.

FIG. 8 shows further aspects of the food carrying delivery bag 700. The electrical heating pad 705 includes a plurality of independently controllable heating elements 805. The thermostat 810, which may include one or more thermistors (not shown), controls each of the plurality of heating elements 805 to establish and maintain the desired temperature(s) across the electrical heating pad 705. To conserve electrical power, the food carrying delivery bag 700 includes one or more accelerometers 815 operably connected to the thermostat 810 and operably configured to sense movements in three dimensions to sense when the food carrying delivery bag 700 is in motion or at rest. When the one or more accelerometers 815 sense that the food carrying delivery bag 700 is being moved from one location to another by sensing the distinct accelerations associated with such motion, the thermostat 810 turns the electrical heating pad 705 on. When the one or more accelerometers 815 detect no motion, the thermostat 810 turns off the electrical heating pad 705. In one example, the accelerometers 815 could detect the user walking and the heating pad can be turned off, as the delivery user approaches the delivery.

Figure 9:
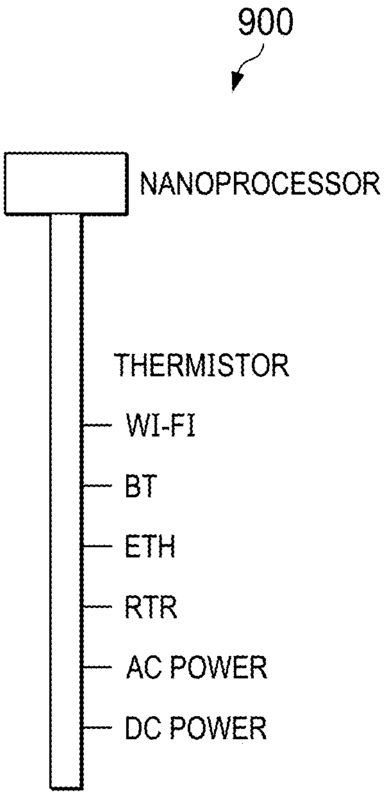
FIG. 9 shows an intelligent interface of the invention.

FIG. 9 shows a universal intelligent interface 900 of an embodiment of the present invention. The universal intelligent interface 900 includes connections for alternating-current power and/or direct-current power; one or more router (RTR), ethernet, Bluetooth® (BT), Wi-Fi™ and/or other types connections by which the electrical heating pad 105 or a cooling device (not shown), the thermostat 810, and the one or more accelerometer 815 can be connected to the intelligent interface 900; and one or more nanoprocessors for control of the devices connected to the universal intelligent interface 900. In some aspects, the universal intelligent interface 900 includes universal Lego®-type connectors.

The power source may be an alternating-current source or a direct-current source, including but not limited to solar power and one or more chargeable or disposable batteries. The power source may be corded or non-corded. The thermostat may be manually operable or automatic. The thermostat may be programmable. In one embodiment, the thermostat detects an impedance of the electrical heating pad and adjusts a power supplied to the electrical heating pad to heat the food parcel to a selected temperature.

Figure 10:
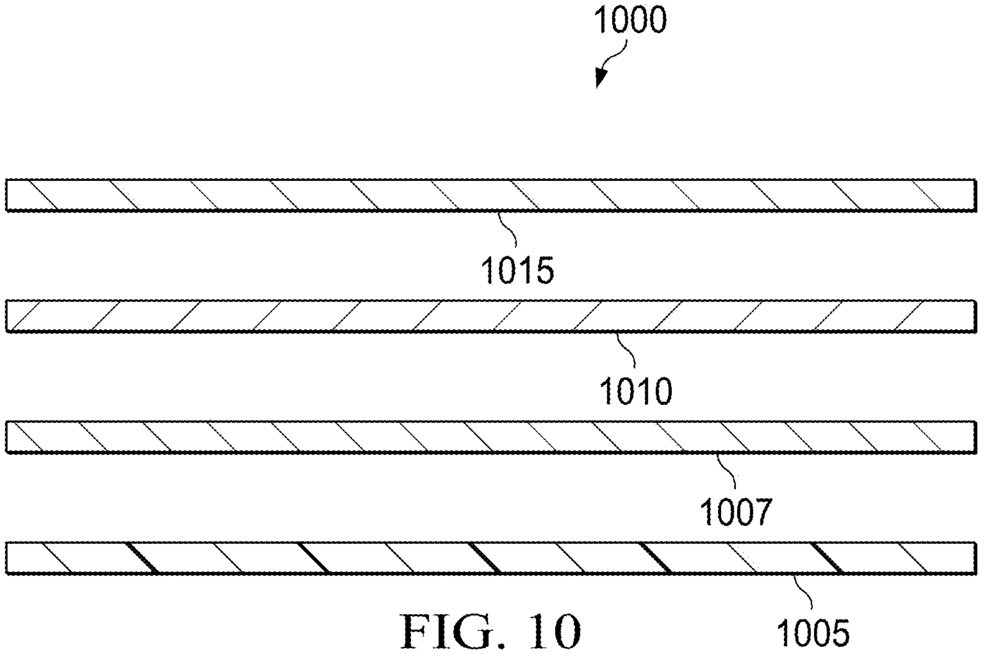
FIG. 10 shows another embodiment of the invention.

FIG. 10 shows another embodiment of the present invention. An insertable food warmer 1000, which is insertable into a supplied pizza bag, casserole carrier, or other food vessel, includes a bottom layer 1005 of waterproof, heat resistant, and cleanable material, which may include a thermoplastic polymer such as polytetrafluoroethylene (PTFE); a reflector layer 1007 on top of the bottom layer 1005; a waterproof, cleanable, and reusable heating pad 1010 on top of the reflector layer 1007, wherein the heating pad 1010 is configured to be connectable to a power source (not shown); and a cleanable metal screen 1015 on top of the heating pad 1010, wherein the metal screen 1015 may include aluminum and be configured as a mesh. The bottom layer 1005, the reflector layer 1007, the heating pad 1010, and the metal screen 1015 are bound together as a unit and insertable as a unit 1020 into the supplied food vessel such that the food to be warmed or kept warm rests on the metal screen 1015. The insertable food warmer 1000 may include a plurality of independently controllable heating elements (not shown) contained within the heating pad 1010, each controlled by a thermostat which may include one or more thermistors (not shown), and one or more accelerometers (not shown) operably connected to the thermostat and operably configured to sense movements in three dimensions to sense when the insertable food warmer 1000 is in motion (and in what kind of motion) or at rest. The one or more accelerometers may also be used in conjunction with a timer to determine how long food carrying delivery bag has been stationary and to indicate to a user that the food may no longer be fresh. The heating elements, thermostat, and accelerometers of the insertable food warmer 1000 are similar to those described with reference to FIG. 8 herein. The insertable food warmer 1000 may also include a universal intelligent interface 900 as described with reference to FIG. 9 herein.

Figure 11:
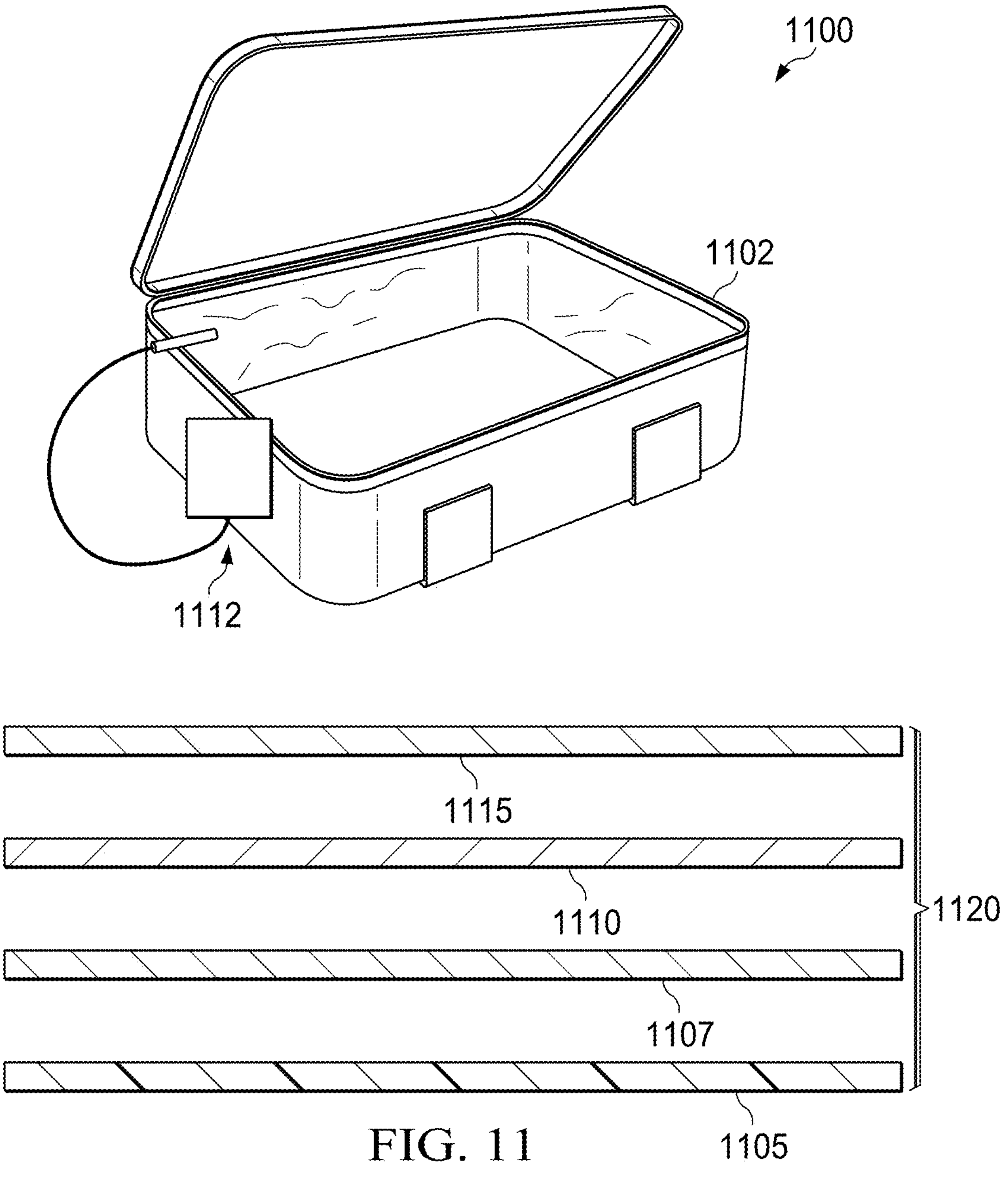
FIG. 11 shows another embodiment of the invention.

FIG. 11 shows another embodiment of the present invention. A food carrying delivery bag 1100 includes a carrier 1102 into an interior of which are integrated a bottom layer 1105 of waterproof, heat resistant, and cleanable material, which may include a thermoplastic polymer such as polytetrafluoroethylene (PTFE); a reflector layer 1107 on top of the bottom layer 1105; a waterproof, cleanable, and reusable heating pad 1110 on top of the reflector layer 1107, wherein the heating pad 1110 is configured to be connectable to a power source 1112; and a cleanable metal screen 1115 on top of the heating pad 1110, wherein the metal screen 1115 may include aluminum and be configured as a mesh. The bottom layer 1105, the reflector layer 1107, the heating pad 1110, and the metal screen 1115 are bound together as a unit and integrated as a unit 1120 into the carrier 1102 such that the food to be warmed or kept warm rests on the metal screen 1115. The food carrying delivery bag 1100 may include a plurality of independently controllable heating elements (not shown) contained within the heating pad 1110, each controlled by a thermostat which may include one or more thermistors (not shown), and one or more accelerometers (not shown) operably connected to the thermostat and operably configured to sense movements in three dimensions to sense when the food carrying delivery bag 1100 is in motion (and in what kind of motion) or at rest. The one or more accelerometers may also be used in conjunction with a timer to determine how long the chafing dich heating apparatus has been stationary and to indicate to a user that the food may no longer be fresh. The heating elements, thermostat, and accelerometers of the food carrying delivery bag 1100 are similar to those described with reference to FIG. 8 herein. The food carrying delivery bag 1100 may also include a universal intelligent interface 900 as described with reference to FIG. 9 herein.

In various embodiments of the invention, a heating pad such as the heating pad 705 or the heating pad 1010, a thermostat such as the thermostat 810, and a universal intelligent interface such as the universal intelligent interface 900 are incorporated into clothing and related items, furniture, and vehicle seats. Clothing and related items into which the heating pad, the thermostat, and the universal intelligent interface can be incorporated include but are not limited to a therapy heating pad, a vest, a jacket, a scarf, a blanket, a handwarmer, a footwarmer, a sleeping bag, and an item of animal clothing or an animal blanket. Furniture into which the heating pad, the thermostat, and the universal intelligent interface can be incorporated include but are not limited to a seat cushion. Vehicle seats into which the heating pad, the thermostat, and the universal intelligent interface can be incorporated include but are not limited to a golf cart seat, a motorcycle seat, and a wheelchair seat.

Figure 12:
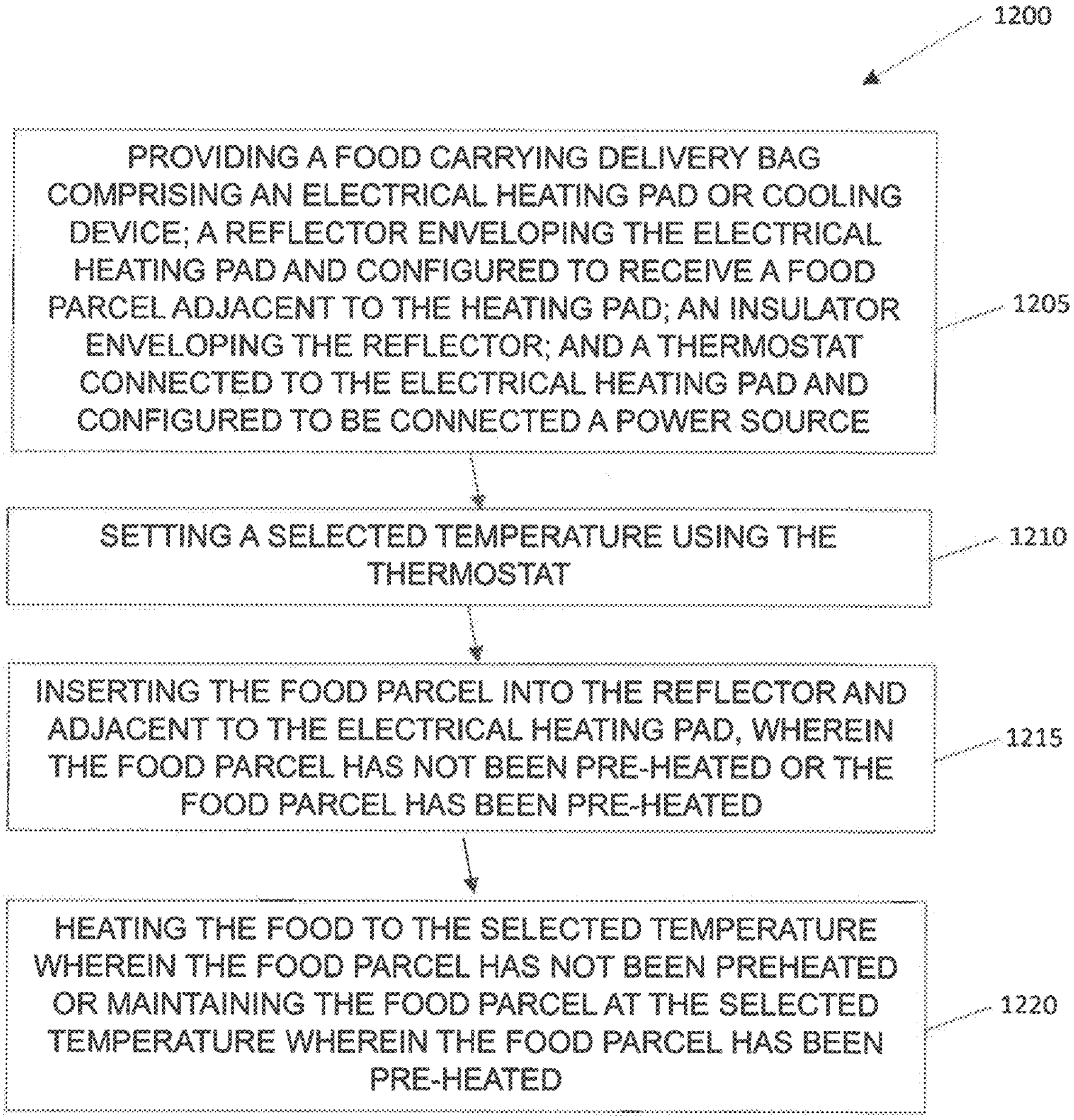
FIG. 12 shows a flowchart for a method embodiment of the invention.

FIG. 12 shows a flowchart of a method embodiment of the present invention. Method 1200 includes blocks 1205, 1210, 1215, and 1220. Block 1205 includes providing a food carrying delivery bag including an electrical heating pad or cooling device; a reflector enveloping the electrical heating pad and configured to receive a food parcel adjacent to the heating pad; an insulator enveloping the reflector; and a thermostat connected to the electrical heating pad and configured to be connected a power source. Block 1210 includes setting a selected temperature using the thermostat. Block 1215 includes inserting the food parcel into the reflector and adjacent to the electrical heating pad, wherein the food parcel has not been pre-heated or the food parcel has been pre-heated. Block 1220 includes heating the food to the selected temperature wherein the food parcel has not been preheated or maintaining the food parcel at the selected temperature wherein the food parcel has been pre-heated.

Any and all aspects of embodiments of the present invention disclosed herein are disclosed to be present together in any single embodiment unless prevented by physical impossibility.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:

1. A chafing dish heating apparatus comprising:

an electrical heating pad or cooling device configured to be placed within a chafing dish receptacle and connectable to a power source;

an inner receptacle reflector configured to receive the chafing dish receptacle, an inner receptacle insulator configured to receive the inner receptacle reflector;

an outer receptacle reflector configured to receive the inner receptacle insulator; and an outer receptacle insulator configured to receive the outer receptacle reflector;

an inner lid reflector, an inner lid insulator configured to receive the inner lid reflector, an outer lid reflector configured to receive a chafing dish lid, and an outer lid insulator configured to receive the outer lid reflector; and a thermostat connected to the electrical heating pad and configured to be connected to the power source.

2. The chafing dish heating apparatus of claim 1, further comprising a universal intelligent interface comprising one or more nanoprocessors and one or more connections to which the electrical heating pad and the thermostat are connected and to which the power source may be connected.

3. The chafing dish heating apparatus of claim 1, wherein the power source is an alternating-current source or a direct-current source.

4. The chafing dish heating apparatus of claim 1, wherein the thermostat is manually operable.

5. The chafing dish heating apparatus of claim 1, wherein the thermostat is programmable.

6. The chafing dish heating apparatus of claim 1, wherein the thermostat detects an impedance of the electrical heating pad and adjusts a power supplied to the electrical heating pad to heat a food parcel to a selected temperature or to maintain the food parcel at the selected temperature.

7. The chafing dish heating apparatus of claim 1, the electrical heating pad comprises one or more independently controllable heating elements and one or more temperature sensors, wherein each of the one or more independently controllable heating elements can be independently controlled to create different temperature zones.

8. The chafing dish heating apparatus of claim 1, further comprising one or more accelerometers operably connected to the thermostat and operably configured to detect accelerations in three dimensions.

9. The chafing dish heating apparatus of claim 8, wherein the one or more accelerometers are operably configured to detect and distinguish an acceleration characteristic of lifting the chafing dish heating apparatus, an acceleration characteristic of lowering the chafing dish apparatus, and an acceleration characteristic of carrying the chafing dish heat apparatus to save energy or for safety.

10. A method of heating a food parcel or maintaining a temperature of a food parcel in a chafing dish comprising:

providing a food parcel requiring heating, wherein the food parcel is contained within a food bag;

providing a chafing dish comprising a chafing dish receptacle and a chafing dish lid;

providing a chafing dish heating apparatus comprising:

an electrical heating pad or cooling device configured to be placed within a chafing dish receptacle and connectable to a power source;

an inner receptacle reflector configured to receive the chafing dish receptacle, an inner receptacle insulator configured to receive the inner receptacle reflector; an outer receptacle reflector configured to receive the inner receptacle insulator; and an outer receptacle insulator configured to receive the outer receptacle reflector;

an inner lid reflector, an inner lid insulator configured to receive the inner lid reflector, an outer lid reflector configured to receive a chafing dish lid, and an outer lid insulator configured to receive the outer lid reflector; and a thermostat connected to the electrical heating pad and configured to be connected to a power source;

placing the electrical heating pad into the chafing dish receptacle;

placing a food bag containing the food parcel into the chafing dish receptacle on the electrical heating pad, wherein the food parcel has not been pre-heated or the food parcel has been pre-heated;

setting a selected temperature using the thermostat; and heating the food parcel to the selected temperature where the food parcel has not been preheated or maintaining the food parcel at the selected temperature where the food parcel has been pre-heated.

11. The method of claim 10, wherein the power source is an alternating-current source or a direct-current source.

12. The method of claim 10, wherein the thermostat is manually operable.

13. The method of claim 10, wherein the thermostat is programmable.

14. The method of claim 10, further comprising detecting an impedance of the electrical heating pad with the thermostat; and adjusting a power supplied to the electrical heating pad to heat the food parcel to the selected temperature.

15. The method of claim 10, wherein the electrical heating pad comprises a plurality of independently controllable heating elements.

16. The method of claim 10, wherein the chafing dish heating apparatus further comprises one or more accelerometers operably connected to the thermostat and operably configured to detect accelerations in three dimensions; and further comprising detecting accelerations in three dimensions.

17. The method of claim 16, wherein the one or more accelerometers are operably configured to detect and distinguish an acceleration characteristic of lifting the chafing dish heating apparatus, an acceleration characteristic of lowering the chafing dish apparatus, and an acceleration characteristic of carrying the chafing dish heat apparatus; and further comprising detecting and distinguishing an acceleration characteristic of lifting the chafing dish heating apparatus, an acceleration characteristic of lowering the chafing dish apparatus, and an acceleration characteristic of carrying the chafing dish heat apparatus to save energy, for safety, or measure a length of time that the food has been heated.

18. The method of claim 10 wherein the chafing dish heating apparatus further comprises a universal intelligent interface comprising one or more nanoprocessors and one or more connections to which the electrical heating pad and the thermostat are connected and to which the power source may be connected.

* * * * *